United States Patent [19]

Chiba et al.

[11] 4,380,622
[45] Apr. 19, 1983

[54] PROCESS FOR PRODUCING ALIPHATIC COPOLYESTERAMIDE, AN ALIPHATIC COPOLYESTERAMIDE AND TUBING MOLDED THEREFROM

[75] Inventors: Kazumasa Chiba; Kazuhiko Kobayashi; Toshio Muraki, all of Nagoya, Japan

[73] Assignee: Toray Industries, Inc., Tokyo, Japan

[21] Appl. No.: 387,334

[22] Filed: Jun. 11, 1982

[30] Foreign Application Priority Data

Jun. 15, 1981 [JP] Japan ................................. 56-90855
Jan. 22, 1982 [JP] Japan .................................. 57-7497

[51] Int. Cl.$^3$ ...................... C08G 63/44; C08G 69/00; C08G 69/44
[52] U.S. Cl. .................................. 528/288; 528/272; 528/274; 528/279; 528/292
[58] Field of Search ............... 528/288, 272, 274, 279, 528/292

[56] References Cited

U.S. PATENT DOCUMENTS 3,997,626 12/1976 Bernert et al. ................... 528/288 X
4,101,524 7/1978 Burzin et al. ........................ 528/288
4,171,424 10/1979 Habermeier et al. ........... 528/288 X
4,207,410 6/1980 Burzin et al. ....................... 528/288

Primary Examiner—Lucille M. Phynes
Attorney, Agent, or Firm—Austin R. Miller

[57] ABSTRACT

The aliphatic copolyesteramide having high degree of polymerization, is prepared by heating a mixture of (A) ester-forming components comprising (a) aliphatic diols and (b) aliphatic dicarboxylic acids and (B) amide-forming components comprising at least one component selected from the group consisting of (a) aliphatic ω-aminocarboxylic acids and (b) equimolar salt of ($\alpha$) aliphatic diamines and ($\beta$) aliphatic dicarboxylic acids, at temperatures of about 150° to 260° C., substantially under an atmospheric pressure, in the presence of catalyst and in the substantially absence of water, and subsequently heating the resulting esterified product at temperatures of about 200° to 300° C. under a reduced pressure. The obtained copolyesteramide can be formed into various molded articles, such as tubing, having excellent flexibility, toughness, shapability, chemical resistance, heat resistance, hydrolysis resistance and fatigue resistance.

38 Claims, No Drawings

PROCESS FOR PRODUCING ALIPHATIC COPOLYESTERAMIDE, AN ALIPHATIC COPOLYESTERAMIDE AND TUBING MOLDED THEREFROM

BACKGROUND OF THE INVENTION

1. Field of the Invention

The present invention relates to a process for producing an aliphatic copolyesteramide, an aliphatic copolyesteramide and tubing molded from the aliphatic copolyesteramide, the tubing having excellent flexibility, toughness, shapability, chemical resistance, heat resistance, hydrolysis resistance and fatigue resistance.

2. Description of the Prior Art

Recently, flexible thermoplastics such as plasticized polyvinylchloride, plasticized polyamides such as nylon 11 and nylon 12, polyurethane and polyetherester elastomer have been investigated for molding into tubing, pipes and hoses employed as various pressure hoses, such as hydraulic hoses and oil pressure hoses, vacuum hoses and automobile parts such as fuel line tubing and brake line tubing. Such tubing has an advantage in that it does not need vulcanization which is required for tubing molded from natural rubber and synthetic rubber and that it has excellent moldability. However, the abovementioned materials have the following disadvantages. That is, polyvinylchloride and polyurethane are inferior in heat resistance, polyurethane is inferior in hydrolysis resistance, polyetherester elastomer is inferior in chemical resistance, polyamide is inferior in flexibility, and plasticized polyamide has a serious tendency of exudation of plasticizer.

It has now been found that an aliphatic copolyesteramide comprising specified components can have a low glass transition temperature and be formed into tubing having excellent flexibility, toughness, chemical resistance and hydrolysis resistance without the addition of plasticizer. It has been known that aliphatic copolyesteramide can be prepared by polymerization of a mixture comprising diamines, dicarboxylic acids, polyhydric alcohols and/or aminocarboxylic acids or lactams in the presence of water under an internal pressure of above 14 bars in the first stage and under a reduced pressure in the second stage (for example in U.S. Pat. No. 4,101,524).

However, a copolyesteramide having high viscosity and good qualities which are necessary to provide tubing exhibiting excellent shapability and mechanical properties, especially cold impact strength, cannot be obtained according to the above-described process. Because inactivation of the catalyst occurs in the presence of water as well as with the high internal pressure in the first stage, prolonging the total time for polymerization degradation, such as partial thermal decomposition of the copolyesteramide results.

BRIEF SUMMARY OF THE INVENTION

An object of the present invention is to provide a process for producing an aliphatic copolyesteramide having high degree of polymerization.

Another object of the present invention is to provide a process for producing an aliphatic copolyesteramide which can be formed into various molded articles and has excellent mechanical strength, flexibility, toughness, heat resistance, chemical resistance and the like.

A further object of the present invention is to provide tubing exhibiting excellent flexibility, toughness, shapability, chemical resistance, heat resistance, hydrolysis resistance and fatigue resistance without the addition of any plasticizers, by molding the aliphatic copolyesteramide.

These objects can be attained by producing an aliphatic copolyesteramide by a process which comprises heating a mixture comprising (A) from about 5 to 80 parts by weight of ester forming components comprising
  ($\alpha$) aliphatic diols having 2 to 6 carbon atoms and
  ($\beta$) aliphatic dicarboxylic acids having 9 to 12 carbon atoms and
(B) from about 95 to 20 parts by weight of amide-forming components comprising at least one component selected from the group consisting of
  (a) aliphatic $\omega$-aminocarboxylic acids having 11 to 12 carbon atoms and
  (b) an equimolar salt of
    ($\alpha$) aliphatic diamines having 6 to 12 carbon atoms and
    ($\beta$) aliphatic dicarboxylic acids having 9 to 12 carbon atoms, at temperatures of about 150° to 260° C., substantially under atmospheric pressure, in the presence of catalysts and substantially in the absence of water, whereby catalytic esterification is carried out and subsequently heating the resulting esterified product at temperatures of about 200° to 300° C. under reduced pressure, whereby polycondensation is carried out.

These objects can also be attained by producing tubing molded from an aliphatic copolyesteramide comprising (A) from about 5 to 50 percent by weight of an ester unit represented by the following general formula (I)

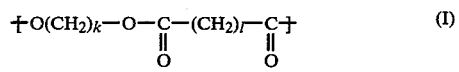

wherein k denotes an integer of 2 to 6 and l denotes an integer of 7 to 10, and (B) from about 95 to 50 percent by weight of at least one amide unit selected from the group consisting of (a) the unit represented by the following general formula (II),

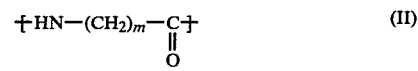

wherein m denotes an integer of 10 to 11, and (b) the unit represented by the following general formula (III)

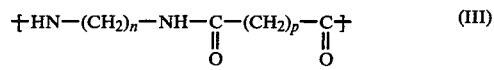

wherein n denotes an integer of 6 to 12 and p denotes an integer of 7 to 10.

DETAIL DESCRIPTION OF THE PREFERRED EMBODIMENTS

The process for producing an aliphatic copolyesteramide is first described.

As diols of the ester-forming component, which is used as the starting raw material of the copolyesteramide, at least one aliphatic diol having 2 to 6 carbon atoms is employed. Representative examples of these aliphatic diols include ethylene glycol, 1,3-propanediol, 1,4-butanediol and 1,6-hexanediol. Preferably 1,4-butanediol and 1,6-hexanediol are employed.

As aliphatic dicarboxylic acids of the ester-forming component which is used as the starting raw material of the copolyesteramide, at least one aliphatic dicarboxylic acid having 9 to 12 carbon atoms is employed. Representative examples of these aliphatic dicarboxylic acids include azelaic acid, sebacic acid and dodecanedioic acid. Preferably sebacic acid and dodecanedioic acid are employed.

As aliphatic ω-aminocarboxylic acids of the amide-forming component, which is used as the starting raw material of the copolyesteramide, at least one aliphatic ω-aminocarboxylic acid having 11 to 12 carbon atoms is employed. Representative examples of these aliphatic ω-aminocarboxylic acids include 11-aminoundecanoic acid and 12-aminododecanoic acid.

As aliphatic diamines of the amide-forming component, which is used as the starting raw material of the copolyesteramide, at least one aliphatic diamine having 6 to 12 carbon atoms is employed. Representative examples of these aliphatic diamines include hexamethylenediamine, decamethylenediamine, undecamethylenediamine and dodecamethylenediamine. Preferably hexamethylenediamine and undecamethylenediamine are employed.

As aliphatic dicarboxylic acids of the amide-forming component, which is used as the starting raw material of the copolyesteramide, at least one aliphatic dicarboxylic acid having 9 to 12 carbon atoms is employed. Representative examples of these aliphatic dicarboxylic acids include azelaic acid, sebacic acid, and dodecanedioic acid. Preferably sebacic acid and dodecanedioic acid are employed.

Commonly, amide-forming components comprising aliphatic diamines having 6 to 12 carbon atoms and aliphatic dicarboxylic acids having 9 to 12 carbon atoms, can be used in the form of equimolar salts.

The aliphatic copolyesteramide of the present invention may be optionally prepared in the presence of an additional small amount of (A) ester-forming components such as neopentylglycol, cyclohexanedimethanol, terephthalic acid, isophthalic acid, naphthalenedicarboxylic acid cyclohexanedicarboxylic acid, adipic acid, dimeric acid, trimesic acid, glycerin, pentaerythritol, ε-caprolactone and polycaprolactone, and (B) amide-forming components such as ε-caprolactum, 6-aminocaproic acid, the equimolar salt of hexamethylenediamine and adipic acid, the equimolar salt of hexamethylenediamine and terephthalic acid, the equimolar salt of hexamethylenediamine and isophthalic acid, the equimolar salt of 2,2,4-trimethylhexamethylenediamine or 2,4,4-trimethylhexamethylenediamine and terephthalic acid, the equimolar salt of hexamethylenediamine and and trimesic acid and the equimolar salt of 1,6,11-triaminoundecane and adipic acid. Aliphatic dicarboxylic acid dialkylesters may be also used as ester-forming components and amide-forming components.

A mixture comprising the above-described ester-forming components and amide-forming components can be fed to the esterification reaction system and subsequently to the polycondensation reaction system. A mixture ratio of ester-forming components to amide-forming components is from about 5 to 80 to from about 95 to 20 parts, preferably from about 10 to 60 to from about 90 to 40 parts, more preferably from about 15 to 40 to from about 85 to 60 parts by weight. Where the amount of ester-forming components is less than 5 parts by weight and the amount of amide-forming components is greater than 95 parts by weight, the molded articles obtained from the copolyesteramide lack flexibility. On the other hand, where the amount of ester-forming components is greater than 80 parts by weight and the amount of amide-forming components is less than 20 parts by weight, properties such as heat resistance and chemical resistance of the copolyesteramide and of the molded articles obtained from it, are deteriorated.

The mixture of starting raw materials is preliminarily heated at temperatures of about 150° to 260° C., substantially under atmospheric pressure, whereby they are esterified, and succeedingly heated at temperatures of about 200° to 300° C. under a reduced pressure of below 10 Torr, preferably below 1 Torr, whereby they are polycondensed. The esterification and polycondensation can be carried out at the same temperature selected in the range of 200° to 280° C., but it is preferred that the temperature of the polycondensation stage be higher than that of the first esterification stage.

It is necessary that the esterification and polycondensation be carried out in the presence of catalysts in order to achieve a high degree of polymerization. In particular, the catalyst used in the esterification should be effective throughout the esterification and polycondensation stages. The aliphatic copolyesteramide produced with a high degree of polymerization in the presence of catalysts can be formed into various types of tubing, pipes and hoses having excellent qualities.

Useful catalysts are titanium compounds, and especially tetraalkyltitanates such as tetrabutyltitanate, tetrapropyltitanate, tetraethyltitanate and tetramethyltitanate, and alkali metal titanium oxalates such as potassium titanate oxalate are preferably used. Tin compounds such as dibutyltin oxide and dibutyltin laurate and lead components such as lead acetate may be also used as catalysts. These catalysts are effective for both the reactions of esterification and polycondensation and therefore the same catalysts can be used in both reaction stages.

It is important in the present invention that the esterification and polycondensation should be carried out substantially in the absence of water. As above-described, the copolyesteramide of the present invention can be produced in the presence of catalysts in order to achieve a viscosity high enough to be molded into tubing having excellent shapability and mechanical properties. Therefore, the amount of water in the reaction system must be kept as low as possible. Otherwise, due to the inactivation of the catalysts caused by the presence of a large quantity of water, the time required for polymerization is prolonged resulting in a copolyesteramide having a high degree of polymerization and excellent quality cannot be obtained. The water produced by condensation should be distilled off immediately after it is produced in the esterification and polycondensation stages.

It is important that the internal pressure of the reaction system be kept substantially to atmospheric pressure in the first stage and that reduced pressure be used in the second stage. Under substantially atmospheric pressure or a reduced pressure, inactivation of catalysts caused by the presence of water in the reaction system, does not occur to a significant degree, since the water produced can be instantly removed from the reaction systems. Especially, it is not preferable in the first stage, that a mixture comprising ester-forming components and amide-forming components be polymerized in the presence of water under high pressure, such as above 14 bars. That is, in the first and second stages, the reaction system should be maintained under substantially atmospheric pressure or reduced pressure, so that water is not present in the reaction system. Therefore, in the present invention, the term "substantially atmospheric pressure" may include somewhat elevated pressure so long as the water is substantially absent in the reaction system. Somewhat elevated pressure prevents the volatilization of components such as diols and diamines which cause molar unbalance and suppression of the degree of polymerization. However, in the first stage of the present invention, atmospheric pressure is preferably employed. The esterification reaction is conducted under an oxygen-free protective gas such as nitrogen, in order to prevent side reactions and thermoxidative decomposition.

The aliphatic copolyesteramide thus obtained has a high degree of polymerization and low glass transition temperature and comprises (A) from about 5 to 50 percent by weight of an ester unit represented by the following general formula (I)

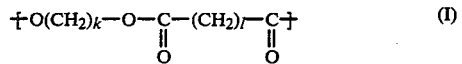
(I)

wherein k denotes an integer of 2 to 6 and l denotes an integer of 7 to 10, and (B) from about 95 to 50 percent by weight of at least one amide unit selected from the group consisting of (a) the unit represented by the following general formula (II),

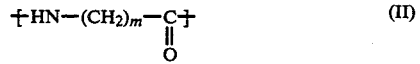
(II)

wherein m denotes an integer of 10 to 11, and (b) the unit represented by the following general formula (III)

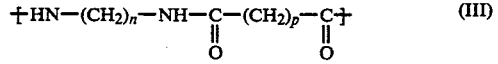
(III)

wherein n denotes an integer of 6 to 12 and p denotes an integer of 7 to 10.

The copolyesteramide of the present invention is a random copolymer having an almost statistical distribution of ester units and amide units. The degree of polymerization of the copolyesteramide is not defined and generally, a relative viscosity, which is measured at 25° C. in orthochlorophenol at a concentration of 0.5 percent, can be varied from about 1.4 to 4.0 according to the final use at will. In particular, the copolyesteramide having a relative viscosity of from 1.5 to 3.0 and comprising from about 5 to 50 percent by weight of ester units represented by the formula (I) and from about 95 to 50 percent by weight of at least one amide unit selected from the group consisting of the united represented by said formula (II) and the unit represented by said formula (III), is practically suitable for molding tubing.

A copolyesteramide having extremely high viscosity may be obtained by solid-state polymerization or by mixing the copolyesteramide with other reactive compounds after melt-polymerization. These methods can enhance melt-viscosity and melt-tension, resulting in tubing which has excellent moldability and mechanical properties.

The melting point of the copolyesteramide is not defined. However, for the purpose of retaining the shape of the tubing at high circumambient temperatures, a copolyesteramide having melting point of above 140° C. is practically used for the molding of the tubing.

The aliphatic copolyesteramide of the present invention has inherent excellent heat resistance and weather resistance, but where it is to be used for various industrial parts which require further stability, the copolyesteramide may contain well-known additives such as heat stabilizers, antioxidants, light stabilizers, ultra violet absorbents and so on in the amount of about 0.005 to 3.0 percent by weight based on the polymer content, such additives being added before, during or after polymerization.

The copolyesteramide of the present invention may also optionally contain other additives such as pigments, dyes, flame retardant agents, lubricants, mold-releasing agents, nucleating agents, antistatic agents, hydrolysis resistant agents, reinforcing agents, plasticizers and other polymer materials in moderate amounts without greatly changing the essential characteristics of the copolyesteramide of the present invention.

The copolyesteramide of the present invention can be formed into a wide range of useful articles by means of conventional molding methods employed in the fabrication of thermoplastics. Especially, machinery parts and automobile parts obtained by injection molding or extrusion molding are useful in practice. Extrusion molding processes and the tubing construction are not particularly defined and conventional methods can be employed. That is, for example, the aliphatic copolyesteramide is heated to the molten-state using an extruder and the tubular extrudate extruded through a die is quenched by the forming apparatus to give tubing having the desired diameter and wall-thickness. In the above-described molding process for forming tubing, calibration methods such as an internal air-pressure technique or a vacuum calibration technique, the adjustment of the cooling temperature and the length of the cooling bath and lubrication of the tubing on the inside surface of the apparatus can be adopted in order to achieve uniform tubing.

The obtained tubing may have the known optional structures, such as a one layer structure or poly layer structures formed in combination with other polymers and the like.

Thus-obtained tubing of the present invention exhibits excellent flexibility which is characterized by low minimum bend radius, high modulus at relatively high temperatures and sufficient flexibility at relatively low temperatures, shapability, heat resistance, chemical resistace, hydrolysis resistance and toughness, without the addition of any plasticizers.

In other words, the tubing of the present invention has the following advantages.

(1) The tubing exhibits excellent flexibility and toughness over a wide range of from relatively high circumambient temperatures to low temperatures, since the tubing is obtained from a copolyesteramide comprising aliphatic components that has a glass transition temperature lower than room temperature.

(2) The aliphatic copolyesteramide of the present invention does not show a remarkable reduction in crystallinity, almost independent of the composition of the components. Therefore, excellent moldability, that is, for example, suppression of the adherence of the tubular extrudate to the sizing plate or cooling sleeve, and rapid solidification of the molten tubing in a cooling bath, can be attained. Moreover, due to such excellent moldability, good uniform wall-thickness and diameter of the tubing can be achieved.

The invention will be more clearly understood with reference to the following Examples.

The copolyesteramides and molded tubing described in the following Examples and Comparative Examples, were characterized as follows:

(1) Relative viscosities were measured at 25° C. in orthochlorophenol at a concentration of 0.5 gram/100 milliliters.
(2) Melting point and glass transition temperature were determined using a differential scanning calorimeter (Perkin Elmer Co. DSC-1B) operating at a scan speed of 20° C./minute.
(3) Tensile properties: ASTM D638
(4) Flexural properties: ASTM D790
(5) Izod impact strength: ASTM D256
(6) Fatigue resistance was determined as folding counts at fracture of a specimen, which was formed by compression molding method and which had a width of 5 millimeters, a length of 80 millimeters and a thickness of 1 millimeter under operating conditions of a folding angle of 270°, at frequency of 200 cycles/minutes under a load of 1.0 kilogram/centimeter$^2$.
(7) Cold temperature impact strength of the tubing was determined as failure percentage of tubing by application of a falling weight of 5.53 kilograms from height of 1 meter on tubing which was exposed to a predetermined temperature.
(8) Resistance of tubing to oil was determined as elongation change to initial value after immersion in ASTM No. 3 oil for 20 days at 120° C.
(9) Resistance of tubing to zinc chloride was determined as observation of cracks after immersion in a 50 percent aqueous solution of zinc chloride for 200 hours at 23° C. in a state of bending to the minimum bend radius.

EXAMPLE 1

A mixture of 74.4 parts by weight of 11-aminoundecanoic acid, 18.0 parts by weight of dodecanedioic acid and 12.6 parts by weight of 1,4-butanediol was introduced into the reaction vessel together with 0.1 parts by weight of tetrabutyltitanate and 0.2 parts by weight of "Irganox" 1010 (which is the trademark of tetrakis[methylene(3,5-di-tert-butyl 4-hydroxyhydrocinnamate)] methane, and which is produced by Ciba Geigy Limited).

After the replacement of air in the vessel by nitrogen, the mixture was heated to 230° C. in 2.5 hours with stirring index nitrogen atmospheric pressure. The esterification reaction was continued for 1 hour at the same temperature, while a mixture of by-produced water, tetrahydrofuran and excess 1,4-butanediol was distilled off. Then the reaction mixture was transferred to the polycondensation reactor equipped with a vacuum line. The internal pressure was gradually reduced to 0.1 Torr in 1 hour simultaneously with the temperature being raised up to 245° C. The polycondensation reaction was continued under these conditions for 1.8 hours to give a clear melt of copolymer. The copolymer was then discharged, water quenched and granulated. The copolyesteramide thus obtained consisted of 75 percent by weight of undecaneamide (N-11) units and 25 percent by weight of butylenedodecadioate (PBD) units. Relative viscosity of this copolyesteramide was 1.72. The melting point and glass transition temperature were 155° C. and −2° C., respectively.

The granules of this copolyesteramide were dried in vacuo and injection molded at a cylinder temperature of 185° C. and mold temperature of 60° C., to give test-pieces designated by ASTM. Mechanical properties of these test-pieces were measured and the results are summarized in Table 1. This copolyesteramide proved to have excellent flexibility, impact strength, fatigue resistance and other good mechanical properties.

COMPARATIVE EXAMPLE 1

The same procedure as Example 1 was repeated except that 10.0 parts by weight of water added together with other monomer components in the esterification stage. In this case, tetrabutyltitanate as catalyst was inactivated by water and the reaction was extremely suppressed. Even after 5 hours of the succeeding polycondensation reaction in a similar procedure to Example 1, relative viscosity of obtained copolyesteramide was only 1.36 and is not sufficiently high for molding tubing.

EXAMPLE 2

A mixture of 78.9 parts by weight of 12-aminododecanoic acid, 10.0 parts by weight of sebacic acid and 8.1 parts by weight of 1,4-butanediol were polymerized by catalytic esterification and succeeding polycondensation reaction in a similar procedure to Example 1. After 2.0 hours of polycondensation, an aliphatic copolyesteramide consisting of 85 percent by weight of dodecaneamide (N-12) units and 15 percent by weight of butylenesebacate (PBS) units was obtained. Physical and mechanical properties of this copolyesteramide are summarized in Table 1.

EXAMPLE 3

A mixture of 63.4 parts by weight of hexamethylenediammonium sebacate, 26.6 parts by weight of sebacic acid and 17.3 parts by weight of 1,6-hexanediol was esterified and succeedingly polycondensed according to the procedure described in Example 1. After 2.2 hours of polycondensation reaction, an aliphatic copolyesteramide consisting of 60 percent by weight of hexamethylenesebacamide (N-610) units and 40 percent by weight of hexamethylenesebacate (PHS) units was obtained. Physical and mechanical properties of this copolyesteramide are summarized in Table 1.

EXAMPLE 4

A mixture of 68.8 parts by weight of 12-aminododecanoic acid, 19.9 parts by weight of dodecanediodic acid, 11.3 parts by weight of 1,6-hexanediol and 0.10 parts by weight of tetrabutyltitanate were introduced into the reactor and the catalytic esterification reaction was carried out in the same way as described in Example 1. Then 0.02 parts by weight of tetrabutyltitanate was added to the reaction mixture and the mixture was subjected to succeeding polycondensation process under a reduced pressure of 0.1 Torr. After 2.0 hours of polycondensation reaction, a copolyesteramide consisting of 70 percent by weight of dodecaneamide (N-12) units and 30 percent by weight of hexamethylenedodecadioate (PHD) units was obtained. Physical and mechanical properties of this copolyesteramide are summarized in Table 1.

TABLE 1

|  |  | Example 1 | Example 2 | Example 3 | Example 4 |
|---|---|---|---|---|---|
| Copolyesteramide | wt % | N-11/PBD :75/25 | N-12/PBS :85/15 | N-610/PHS :60/40 | N-12/PHD :70/30 |
| Relative viscosity | — | 1.72 | 1.61 | 1.60 | 1.62 |
| Melting point | °C. | 155 | 164 | 135 | 150 |
| Glass transition temperature | °C. | −2 | 2 | 0 | −4 |
| Tensile strength at yield (23° C.) | kg/cm$^2$ | 180 | 200 | 190 | 170 |
| Flexural strength at yield (23° C.) | kg/cm$^2$ | 220 | 250 | 230 | 180 |
| Flexural modulus |  |  |  |  |  |
| (23° C.) | kg/cm$^2$ | 4,500 | 5,200 | 4,200 | 2,900 |
| (−20° C.) | kg/cm$^2$ | 12,000 | 12,500 | 12,000 | 11,500 |
| (−40° C.) | kg/cm$^2$ | 14,900 | 15,200 | 14,800 | 14,000 |
| Izod impact strength |  |  |  |  |  |
| (23° C.) | kg.cm/cm.notch | 50 | 48 | 42 | Non Break |
| (−20° C.) | kg.cm/cm.notch | 20 | 20 | 19 | 25 |
| Fatigue resistance (23° C.) | counts | >10,000 | >10,000 | >10,000 | >10,000 |

COMPARATIVE EXAMPLE 2

The same procedure as Example 4 was repeated except 7.5 parts by weight of water was added together with other monomer components in the esterification stage. Then 0.02 parts by weight of tetrabutyltitanate was added to the reaction mixture and the succeeding polycondensation was carried out in the similar way to Example 4. After the polycondensation reaction was continued for 2.0 hours which is the same period as in Example 4, copolyesteramide was discharged. Relative viscosity of the thus-obtained copolyesteramide was 1.30, being lower than that of Example 4.

EXAMPLE 5

The aliphatic copolyesteramide obtained in Example 1 was dried in vacuo and using a 45 millimeter diameter extruder which had L/D of 23, heated at 200° C. to yield a tubular extrudate. Calibration of the tubing was carried out by means of a vacuum calibration technique while the temperature of cooling water was kept at 12° C. to give tubing with outside and inside diameter of 8 millimeters and 6 millimeters respectively. With this molding process, good lubrication between the tubing and the internal surface of the calibrator and rapid solidification of the tubing in the cooling bath could be achieved, resulting in the obtained tubing having excellent uniform wall-thickness. Mechanical properties of this tubing were measured and the results are summarized in Table 2. The tubing thus obtained proved to have high impact strength and excellent flexibity even at low temperatures.

COMPARATIVE EXAMPLE 3

Flexural modulus of polyundecaneamide obtained by melt-polymerization of 11-aminoundecanoic acid was 12,000 kiligrams/centimer$^2$ at 23° C., higher than that of the aliphatic copolyesteramide in Example 1. Therefore, the tubing obtained by molding of polyundecaneamide had insufficient flexibility.

COMPARATIVE EXAMPLE 4

A copolyesteramide consisting of 40 percent by weight of undecaneamide units and 60 percent by weight of butylenedodecadioate was molded into tubing in a procedure similar to Example 5. However, the melting point of the copolyesteramide described in this example was as low as 103° C. and so the tubing had practically poor heat resistance.

EXAMPLES 6 to 7

The aliphatic copolyesteramides obtained in Examples 2 and 4 were molded into tubing using the same procedure as described in Example 5. Mechanical properties of the tubing are summarized in Table 2.

TABLE 2

|  |  | Example 5 | Example 6 | Example 7 |
|---|---|---|---|---|
| Copolyesteramide | wt % | N-11/PBD :75/25 | N-12/PBS :85/15 | N-12/PHD :70/30 |
| Cold temperature impact strength (Failure percentage) |  |  |  |  |
| (23° C.) | % | 0 | 0 | 0 |
| (0° C.) | % | 0 | 0 | 0 |
| (−40° C.) | % | 10 | 15 | 5 |
| (−60° C.) | % | 15 | 20 | 10 |
| Resistance to oil (Elongation change) | % | 5 | 3 | 7 |
| Resistance to zinc chloride (Existence of cracks) |  | None | None | None |

EXAMPLES 8 TO 10

By the method described in Example 1, but varying the kind and amount of the components, the aliphatic copolyesteramides were prepared, and tubing was molded using the same procedure as Example 5. Physical and mechanical properties of the tubing are summarized in Table 3.

TABLE 3

|  |  | Example 8 | Example 9 | Example 10 |
|---|---|---|---|---|
| Copolyesteramide | wt % | N-11/PBD :70/30 | N-12/PBS :75/25 | N-612/PHS :65/35 |

TABLE 3-continued

| | | Example 8 | Example 9 | Example 10 |
|---|---|---|---|---|
| Relative viscosity | | — | 1.68 | 1.57 | 1.72 |
| Melting point | °C. | 154 | 147 | 150 |
| Glass transition temperature | °C. | −4 | −5 | 0 |
| Cold temperature impact strength (Failure percentage) | | | | |
| (23° C.) | % | 0 | 0 | 0 |
| (0° C.) | % | 0 | 0 | 0 |
| (−40° C.) | % | 5 | 10 | 10 |
| (−60° C.) | % | 15 | 15 | 20 |
| Resistance to oil (Elongation change) | % | 5 | 5 | 5 |
| Resistance to zinc chloride (Existence of cracks) | | None | None | None |

What we claim is:

1. A process for producing an aliphatic copolyesteramide which comprises heating a mixture comprising substantially
   (A) from about 5 to 80 parts by weight of ester-forming components comprising
      (α) aliphatic diols having 2 to 6 carbon atoms and
      (β) aliphatic dicarboxylic acids having 9 to 12 carbon atoms and
   (B) from about 95 to 20 parts by weight of amide-forming components comprising at least one component selected from the group consisting of
      (a) aliphatic ω-aminocarboxylic acids having 11 to 12 carbon atoms and
      (b) equimolar salt of
         (α) aliphatic diamines having 6 to 12 carbon atoms and
         (β) aliphatic dicarboxylic acids having 9 to 12 carbon atoms,
at temperatures of about 150° to 260° C., substantially under an atmospheric pressure, in the presence of catalysts and in the substantially absence of water, whereby catalytic esterification is carried out and subsequently heating the resulting esterified product at temperatures of about 200° to 300° C. under a reduced pressure, whereby polycondensation is carried out.

2. The process of claim 1 wherein said aliphatic copolyesteramide comprises substantially (A) from about 10 to 60 parts by weight of ester-forming components and (B) from about 90 to 40 parts by weight of amide-forming components.

3. The process of claim 1 wherein said aliphatic diol is selected from the group consisting of 1,4-butanediol and 1,6-hexanediol.

4. The process of claim 1 wherein said aliphatic dicarboxylic acid of ester-forming component is selected from the group consisting of sebacic acid and dodecanedioic acid.

5. The process of claim 1 wherein said aliphatic ω-aminocarboxylic acid is selected from the group consisting of 11-aminoundecanoic acid and 12-aminododecanoic acid.

6. The process of claim 1 wherein said aliphatic diamine is selected from the group consisting of hexamethylenediamine and undecamethylenediamine.

7. The process of claim 1 wherein said aliphatic dicarboxylic acid of amide-forming component is selected from the group consisting of sebacic acid and dodecanedioic acid.

8. The process for producing an aliphatic copolyesteramide of claim 1 wherein said aliphatic diol is selected from the group consisting of 1,4-butanediol and 1,6-hexanediol, and said aliphatic dicarboxylic acid of ester-forming component is selected from the group consisting of sebacic acid and dodecanedioic acid, and said aliphatic ω-aminocarboxylic acid is selected from the group consisting of 11-aminoundecanoic acid and 12-aminododecanoic acid.

9. The process of claim 8 wherein said aliphatic copolyesteramide comprises substantially from about 15 to 40 parts by weight of ester-forming component and from about 85 to 60 parts by weight of amide-forming component.

10. The process of claim 1 wherein said aliphatic diol is selected from the group consisting of 1,4-butanediol and 1,6-hexanediol, and said aliphatic dicarboxylic acid of ester-forming component is selected from the group consisting of sebacic acid and dodecanedioic acid, and said aliphatic diamine is selected from the group consisting of hexamethylenediamine and undecamethylenediamine, and said aliphatic dicarboxylic acid of amide-forming component is selected from the group consisting of sebacic acid and dodecanedioic acid.

11. The process of claim 1 wherein said catalyst is titanium compound.

12. The process of claim 11 wherein said titanium compound is selected from the group consisting of tetraalkyltitanate and alkalimetal titanium oxalate.

13. The process of claim 12 wherein said tetraalkyltitanate is selected from the group consisting of tetramethyltitanate, tetraethyltitanate, tetrapropyltitanate and tetrabutyltitanate.

14. Tubing molded from aliphatic copolyesteramide comprising substantially (A) from about 5 to 50 percent by weight of ester unit represented by the following general formula (I)

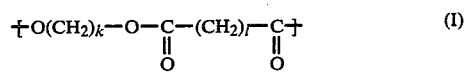

wherein k denotes an integer of 2 to 6 and l denotes an integer of 7 to 10, and
(B) from about 95 to 50 percent weight of at least one amide unit selected from the group consisting of (a) the unit represented by the following general formula (II),

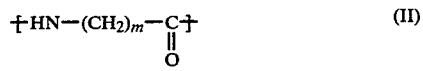

wherein m denotes an integer of 10 to 11, and (b) the unit represented by the following general formula (III)

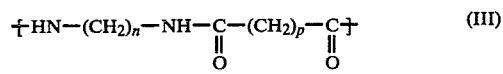

wherein n denotes an integer of 6 to 12 and p denotes an integer of 7 to 10.

15. The tubing of claim 14 wherein k in said formula (I) denotes an integer selected from the group consisting of 4 and 6.

16. The tubing of claim 14 wherein l in said formula (I) denotes an integer selected from the group consisting of 8 and 10.

17. The tubing of claim 14 wherein n in said formula (III) denotes an integer selected from the group consisting of 6 and 11.

18. The tubing of claim 14 wherein p in said formula (III) denotes an integer selected from the group consisting of 8 and 10.

19. The tubing molded from aliphatic copolyesteramide of claim 14 wherein said ester unit is represented by said formula (I) in which k denotes an integer selected from the group consisting of 4 and 6 and in which l denotes an integer selected from the group consisting of 8 and 10, and said amide unit is represented by said formula (II).

20. The tubing of claim 19 wherein said aliphatic copolyesteramide comprising substantially from about 15 to 40 percent by weight of said ester unit and from about 85 to 60 percent by weight of said amide unit.

21. The tubing of claim 14 wherein said ester unit is represented by said formula (I) in which k denotes an integer selected from the group consisting of 4 and 6 and in which l denotes an integer selected from the group consisting of 8 and 10, and said amide unit is represented by said formula (III) in which n denotes an integer selected from the group consisting of 6 and 11 and p denotes an integer selected from the group consisting of 8 and 10.

22. An aliphatic copolyesteramide comprising substantially (A) from about 5 to 50 percent by weight of ester unit represented by the following general formula (I)

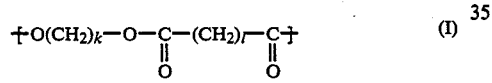

wherein k denotes an integer of 2 to 6 and l denotes an integer of 7 to 10, and
(B) from about 95 to 50 percent by weight of at least one amide unit selected from the group consisting of (a) the unit represented by the following general formula (II),

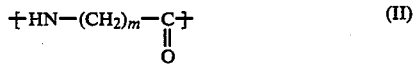

wherein m denotes an integer of 10 to 11, and (b) the unit represented by the following general formula (III)

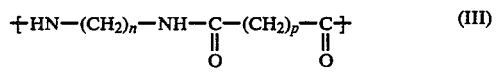

wherein n denotes an integer of 6 to 12 and p denotes an integer of 7 to 10, said aliphatic copolyesteramide having a relative viscosity of from about 1.4 to 4.0 and a glass transition temperature below about room temperature.

23. The aliphatic copolyesteramide of claim 22 wherein k in said formula (I) denotes an integer selected from the group consisting of 4 and 6.

24. The aliphatic copolyesteramide of claim 22 wherein l in said formula (I) denotes an integer selected from the group consisting of 8 and 10.

25. The aliphatic copolyesteramide of claim 22 wherein n in said formula (III) denotes an integer selected from the group consisting of 6 and 11.

26. The aliphatic copolyesteramide of claim 22 wherein p in said formula (III) denotes an integer selected from the group consisting of 8 and 10.

27. The aliphatic copolyesteramide of claim 22 wherein said ester unit is represented by said formula (I) in which k denotes an integer selected from the group consisting of 4 and 6 and in which l denotes an integer selected from the group consisting of 8 and 10, and said amide unit is represented by said formula (II).

28. The aliphatic copolyesteramide of claim 27 wherein said aliphatic copolyesteramide comprises substantially from about 15 to 40 percent by weight of said ester unit and from about 85 to 60 percent by weight of said amide unit.

29. The aliphatic copolyesteramide of claim 22 wherein said ester unit is represented by said formula (I) in which k denotes an integer selected from the group consisting of 4 and 6 and in which l denotes an integer selected from the group consisting of 8 and 10, and said amide unit is represented by said formula (III) in which n denotes an integer selected from the group consisting of 6 and 11 and p denotes an integer selected from the group consisting of 8 and 10.

30. The aliphatic copolyesteramide of claim 22 wherein said aliphatic copolyesteramide has a relative viscosity of from about 1.5 to 3.0.

31. An aliphatic copolyesteramide comprising
(A) from about 5 to 80 parts by weight of ester-forming components comprising
($\alpha$) aliphatic diols having 2 to 6 carbon atoms and
($\beta$) aliphatic dicarboxylic acids having 9 to 12 carbon atoms and
(B) from about 95 to 20 parts by weight of amide-forming components comprising at least one component selected from the group consisting of
(a) aliphatic $\omega$-aminocarboxylic acids having 11 to 12 carbon atoms and
(b) equimolar salt of
($\alpha$) aliphatic diamines having 6 to 12 carbon atoms and
($\beta$) aliphatic dicarboxylic acids having 9 to 12 carbon atoms, formed by heating said components (A) and said components (B) at temperatures of about 150° to 260° C., substantially under atmospheric pressure in the presence of catalysts and substantially in the absence of water, whereby catalytic esterification is carried out and subsequently heating the resulting esterified product at temperatures of about 200° to 300° C. under reduced pressure, whereby polycondensation is carried out.

32. The aliphatic copolyesteramide of claim 31 wherein said aliphatic copolyesteramide has a relative viscosity of from about 1.4 to 4.0.

33. The aliphatic copolyesteramide of claim 32 wherein said aliphatic copolyesteramide has a relative viscosity of from about 1.5 to 3.0.

34. The aliphatic copolyesteramide of claim 31 wherein said aliphatic copolyesteramide has a glass transition temperature below about room temperature.

35. The aliphatic copolyesteramide of claim 22 or 31 wherein said copolyesteramide has a melting point above about 140° C.

36. A shaped article of aliphatic copolyesteramide comprising substantially (A) from about 5 to 50 percent by weight of ester unit represented by the following general formula (I)

$$\text{+O(CH}_2)_k\text{—O—C—(CH}_2)_l\text{—C+} \qquad (I)$$
$$\qquad\qquad\qquad\quad \|\qquad\qquad\|$$
$$\qquad\qquad\qquad\quad O\qquad\qquad O$$

wherein k denotes an integer of 2 to 6 and l denotes an integer of 7 to 10, and (B) from about 95 to 50 percent by weight of at least one amide unit selected from the group consisting of (a) the unit represented by the following general formula (II), $$\text{+HN—(CH}_2)_m\text{—C+} \qquad (II)$$
$$\qquad\qquad\qquad\quad \|$$
$$\qquad\qquad\qquad\quad O$$

wherein m denotes an integer of 10 to 11, and (b) the unit represented by the following general formula (III)

$$\text{+HN—(CH}_2)_n\text{—NH—C—(CH}_2)_p\text{—C+} \qquad (III)$$
$$\qquad\qquad\qquad\qquad\quad \|\qquad\qquad\|$$
$$\qquad\qquad\qquad\qquad\quad O\qquad\qquad O$$

wherein n denotes an integer of 6 to 12 and p denotes an integer of 7 to 10.

37. The shaped article of claim 36 wherein said article is extrusion molded tubing.

38. The shaped article of claim 36 wherein said article is injection molded.

* * * * *